United States Patent [19]
Hulen et al.

[11] Patent Number: 5,497,373
[45] Date of Patent: Mar. 5, 1996

[54] MULTI-MEDIA INTERFACE

[75] Inventors: John S. Hulen, Gaithersburg, Md.; David Oren, Melville, N.Y.

[73] Assignee: Ericsson Messaging Systems Inc., Woodbury, N.Y.

[21] Appl. No.: 216,104

[22] Filed: Mar. 22, 1994

[51] Int. Cl.⁶ .............................. H04J 3/16; G06F 3/00; G06F 13/00
[52] U.S. Cl. ................... 370/79; 370/85.13; 370/110.1; 370/112; 379/89; 379/35.3; 379/399; 348/13; 395/154; 395/500; 395/800
[58] Field of Search ......................... 370/58.1, 68, 58.2, 370/110.1, 79, 85.1, 85.13, 85.14, 68.1, 77, 112, 66; 379/89, 353, 67, 399, 68, 353, 350, 90; 348/13, 14, 16, 705, 706; 364/131, 133, 134; 395/153, 154, 200, 425, 500, 725, 800

[56] References Cited

U.S. PATENT DOCUMENTS

| | | | |
|---|---|---|---|
| 4,371,752 | 2/1983 | Matthews et al. | 179/7.1 |
| 4,511,969 | 4/1985 | Koenig et al. | 364/200 |
| 4,592,048 | 5/1986 | Bechner et al. | 370/110.1 |
| 4,646,289 | 2/1987 | Tsiakas et al. | 370/76 |
| 4,715,044 | 12/1987 | Gartner | 375/8 |
| 4,748,656 | 5/1988 | Gibbs et al. | 379/93 |
| 4,878,196 | 10/1989 | Rose | 364/900 |
| 4,882,727 | 11/1989 | Williams et al. | 370/79 |
| 4,991,169 | 2/1991 | Davis et al. | 370/77 |
| 5,001,710 | 3/1991 | Gawrys et al. | 370/110.1 |
| 5,007,017 | 4/1991 | Kobayashi | 364/900 |
| 5,062,104 | 10/1991 | Lubarsky et al. | 370/60 |
| 5,142,528 | 8/1992 | Kobayashi et al. | 370/79 |
| 5,151,935 | 9/1992 | Slife et al. | 379/240 |
| 5,208,850 | 5/1993 | Kino | 379/67 |

*Primary Examiner*—Alpus Hsu
*Assistant Examiner*—Ricky Ngo
*Attorney, Agent, or Firm*—Nixon & Vanderhye

[57] ABSTRACT

A multi-media interface universally and flexibly supports present (and contemplated) messaging applications including voice mail, facsimile mail, electronic mail, interactive voice response, automated attendant surface services, audio text services, electronic messaging services, radio paging services, speech recognition/speech synthesis, DTMF tone detection, voice recognition, video messaging, video mail, interface of voice and data between the public switched telephone network (PSTN), the packet switched public data network (PSPDN), and mobile/portable telephone subscribers, e.g. cellular telephones and does so at a very high throughput. In order for the host messaging center to provide these services to subscribers communicating over the various communications networks, the multi-media interface makes the necessary protocol conversions for different telecommunications protocols corresponding to various types of telecommunications media (and associated control signalling) which may include, for example, speech in analog form, speech data in pulse code modulated (PCM) form, modem data in PCM digital form, data in analog form modulating sinusoidal carriers, and data in various digital forms associated with a variety of protocol standards. The multi-media interface includes a programmable line interface module and a time slot interchanger switch selectively routes various time slots of information to/from multiple parallel digital signal processors (DSPs), each with its own dual port, high speed RAM. A local central processing unit (CPU) controls and coordinates the line interface, time slot interchanger, and DSPs via a local bus in accordance with the host messaging center. The DSPs are reconfigurable in real time to selectively perform protocol conversions to/from the host's processing and storage format for a wide variety of communications media. Each DSP can simultaneously process up to six digital communications channels so that a large number of multi-media subscribers can be served by the host messaging center in real time.

29 Claims, 10 Drawing Sheets

| HOST CHANNEL | CALL PROCESSING SERVICE | EXTERNAL TDM TIME SLOT | MMI PORT | MMI OFFSET |
|---|---|---|---|---|
| 3 | VOICE OUT | 11 | 2 | 0 |
| 3 | TONE DETECT | 11 | 5 | 7 |

*SERVICE TABLE*

| CHANNEL ID | SERVICE ID(S) | TDM LINE | TIME SLOT | SERVICE PORT | OFFSET |
|---|---|---|---|---|---|
| | | | | | |

MULTI-MEDIA INTERFACE

FIELD OF THE INVENTION

The present invention relates to providing multi-media messaging services over fixed telephone, radiotelephone, paging and other types of communication networks, and more particularly, to a multi-media interface.

BACKGROUND AND SUMMARY OF THE INVENTION

The current and continuing trend in the telecommunications industry is toward providing a wide variety of information and communication services (hereafter "messaging services") over various communications networks to remote subscribers having diverse analog and digital communications equipment in an integrated fashion. Such communication services include, for example, voice messaging, facsimile messaging, wide area paging, electronic mail, electronic document interchange, interactive voice response, audio text, speech synthesis, speech recognition, video messaging/video mail, etc.

To provide these messaging services, different types of communications media from different types of communications equipment and processing protocols must be interfaced to a single host system or messaging center that provides the messaging services. For example, the host messaging center might notify a subscriber of various messages (e.g., pages, voice mail messages, etc.). To perform these services, protocol conversions must be performed between the format employed by the host messaging center and the various telecommunications formats employed by diverse subscriber equipment. One example is the protocol conversion between voice information received in pulse code modulated (PCM) format to/from a data compressed format in which the voice information is processed and stored at the host messaging center.

Companies that provide information services over the public telephone network generally use hardwired transceiving and protocol conversion equipment dedicated to a particular type of equipment and communications format/protocol. This dedicated hardware approach has obvious drawbacks in terms of cost, flexibility, and adaptability. For example, dedicated hardware cannot be readily modified to increase data throughput; nor can it be adapted to handle communication protocols corresponding to new telecommunication equipment and services. To support multiple type of messaging services to a diverse set of communications equipment, costly replacements and new hardwire designs of dedicated hardware are required.

More recently, digital signal processing has been used to process a digital communications trunk line as described for example in U.S. Pat. No. 4,991,169 to Davis et al. Unfortunately, even though the digital signal processing in Davis adds some flexibility in converting different types of signal formats, it lacks sufficient channel handling capacity and data throughput for large scale and/or sophisticated multi-media messaging applications. While Davis might be suitable for some very simple conversion algorithms such as DTMF detection and a low capacity system, Davis' system is severely limited with respect to the number of communication channels that can be handled. Nor can Davis' system perform different protocol conversion processes in parallel. Moreover, Davis lacks the ability to dynamically change the protocol conversion algorithm executed by the DSP system in real time while still processing channels.

What is needed is a multi-media interface that overcomes these deficiencies in terms of much increased handling and throughput capacity and increased system adaptability/flexibility to different communication media types to provide subscribers with a variety of multi-media communications options in real time.

The present invention provides a multi-media interface (MMI) that universally and flexibly supports present (and contemplated) messaging applications including voice mail, facsimile mail, electronic mail, interactive voice response, DTMF tone detection, automated attendant services, audio text services, radio paging services, speech recognition/speech synthesis, voice recognition, video messaging, video mail, common channel signalling, short messaging services, etc. The MMI interfaces multi-media voice and data between various communication networks including for example the public switched telephone network (PSTN), the packet switched public data network (PSPDN), and the cellular telephone and paging networks at a very high data throughput. In order for the host messaging center to provide these services to multi-media subscribers communicating over various communications networks, the multi-media interface makes necessary protocol conversions for different telecommunications protocols corresponding to various types of telecommunications media (and associated control signalling) which may include, for example, speech in analog form, speech data in pulse code modulated (PCM) form, modem data in PCM form, data in analog form modulating sinusoidal carriers, and data in various digital forms associated with a variety of protocol standards. A programmable line interface module and a time slot interchanger frame the received information and selectively route various time slots of information from the communications network to/from multiple parallel digital signal processors (DSPs) (each with its own dual port, high speed RAM) to perform various protocol conversions. A local central processing unit (CPU) controls and coordinates the line interface, time slot interchanger, and DSPs via a local bus in accordance with commands from the host messaging center.

The programmable line interface module links subscriber communications information received from a communications network through time division multiplex (TDM) channels (or time slots) corresponding to digital carrier systems for North American (T1) and European (E1) standards. The line interface module frames and synchronizes the incoming raw data, PCM voice, modem, and other media formats and routes that information to the time slot interchanger which then connects a particular time slot channel to one of the multiple, parallel digital signal processors, e.g. six. Functioning as the interface between the host messaging center and digital carrier channels routed through the time slot interchanger, the DSPs perform virtually any kind of necessary protocol conversion so that the information can be processed and stored in the protocol format of the host. For example, incoming quantized voice samples in A-PCM or μ-PCM format may be converted using regular pulse excitation long term prediction (RPE-LTP) algorithms into a compressed data format used by the host messaging center.

The multiple parallel digital signal processors operate completely independently of each other and communicate with the local CPU via the local CPU bus using their dedicated, dual port RAMs. In response to channel service requests from time slots over multiple time division multiplex communication lines, each DSP individually processes in parallel multiple time slots of information in the process of handling channel service requests. As a result, in an example where each DSP performs a voice protocol conversion algorithm such as that just described for six time slots, if six parallel DSPs were all processing voice in this manner, the MMI would be handling thirty-six time slots simultaneously.

At initial system configuration and also in real time (if system needs demand), the local CPU dynamically allocates one or more of the DSPs to handle different types of protocol conversions for multiple communications channels. For example, with each digital signal processor processing multiple time slots of information at one time (i.e. six or seven time slot channels for each TDM frame), five DSPs could be configured to handle voice conversion processing for twenty-five voice channels, and one DSP could be configured to handle protocol conversions for five facsimile channels.

Depending upon what services are required by a particular caller, the local CPU downloads appropriate protocol conversion algorithms from the host messaging center to a selected one or more DSPs using a service configuration table that is downloaded from the host messaging center. Taking a high level example in a voice mail context, if a caller presses a DTMF button during a voice prompt indicating a Group III facsimile service request, the host messaging center commands the MMI to route this Group Ill facsimile call to one or more of the DSPs currently configured to provide the necessary protocol conversions for Group III facsimile. In this way, the converted facsimile information can be stored in data compressed binary form in the host messaging center under the caller's mailbox identification number.

If a caller wishes to interact with the host messaging center via interactive voice rather than pushbutton or keyboard and that service is not presently being supported by one of the DSPs, the appropriate voice recognition and voice synthesis software is downloaded from the host center to one or more of the DSPs via a VME interface, the local CPU, and the DSP's corresponding dual port RAM. The DSP(s) is(are) then configured with the necessary software to perform the protocol conversions required so that the host messaging center and caller can interact by voice. Other software may be similarly downloaded in real time to any of the multiple DSPs to ensure that other messaging services such as voice mail, facsimile mail, etc. are provided to multiple diverse subscribers with fast and efficient protocol conversion.

Because the architecture of the multi-media interface is modular, it is readily adaptable to handle any other types of protocols to permit handling of new data and providing of new messaging/telephony services without changing its basic architecture. For example, more parallel DSPs could be added to provide greater capacity, greater throughput, and/or new types of call services requiring new protocol conversions. In addition, the DSPs can be configured in real time to adapt to system needs so that if more data processing capacity is now required for an increase in facsimile related services and voice related services are down, one or more DSPs could be removed from voice protocol conversion and dedicated to facsimile protocol conversion. Alternatively, the DSPs could be replaced with other processing hardware more suited to a particular application. And as described above, if a new communications medium is added to the system, e.g. video image signals for video conferencing, the corresponding protocol conversion software is readily downloaded into one or more of the parallel DSPs to accommodate these new communications medium signals.

These and other features, advantages, and benefits of the present invention will be more fully understood by those of ordinary skill in the art from the following written description and claims read in conjunction with the drawings.

BRIEF DESCRIPTION OF THE DRAWINGS

FIG. 3(b) is a call processing service table describing the MMI configuration illustrated in FIG. 3a;

DETAILED DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

The present invention receives and processes signals transmitted from various different types of telecommunications equipment (multi-media) over the public, cellular, and other communication networks in a variety of transmission formats—both analog and digital. For example, voice signals, Group III facsimile, and other analog data modem signals are typically modulated by frequency or phase shift keys and then scaled or companded to conform with analog telephone standards like A-law or µ-law PCM format according to CCITT G.711. In functional terms, this means that digital facsimile information converted and transmitted by the facsimile machine into analog tones for transmission on existing over telephone lines must be converted into digitized analog signals for long distance transmission. Of course, this system of digital-to-analog-to-digital conversion for transmission and then conversion back to analog and back to digital for a receiving facsimile to print the page is inefficient. However, most users still have old style telecommunication lines connecting their facsimile machines to digital communication networks and therefore use the Group III facsimile format. On the other hand, Group IV facsimile, ISDN LSPB, and SS7 signalling line protocols are transmitted digitally directly on the telephone line without companding or modulation and therefore are in a format that does not require converting the digital facsimile into modulated tones.

Consequently, the information on telephony lines is in two general types: continuous, noninterruptible signals (e.g. voice) and segmented interrupible signals (e.g. facsimile). These signals are formatted using one of many line protocols or a combination of line and data protocol types. Those protocols must be converted into binary signals that directly represent the data to be stored or processed in compressed form by the host messaging center.

Figure 1:
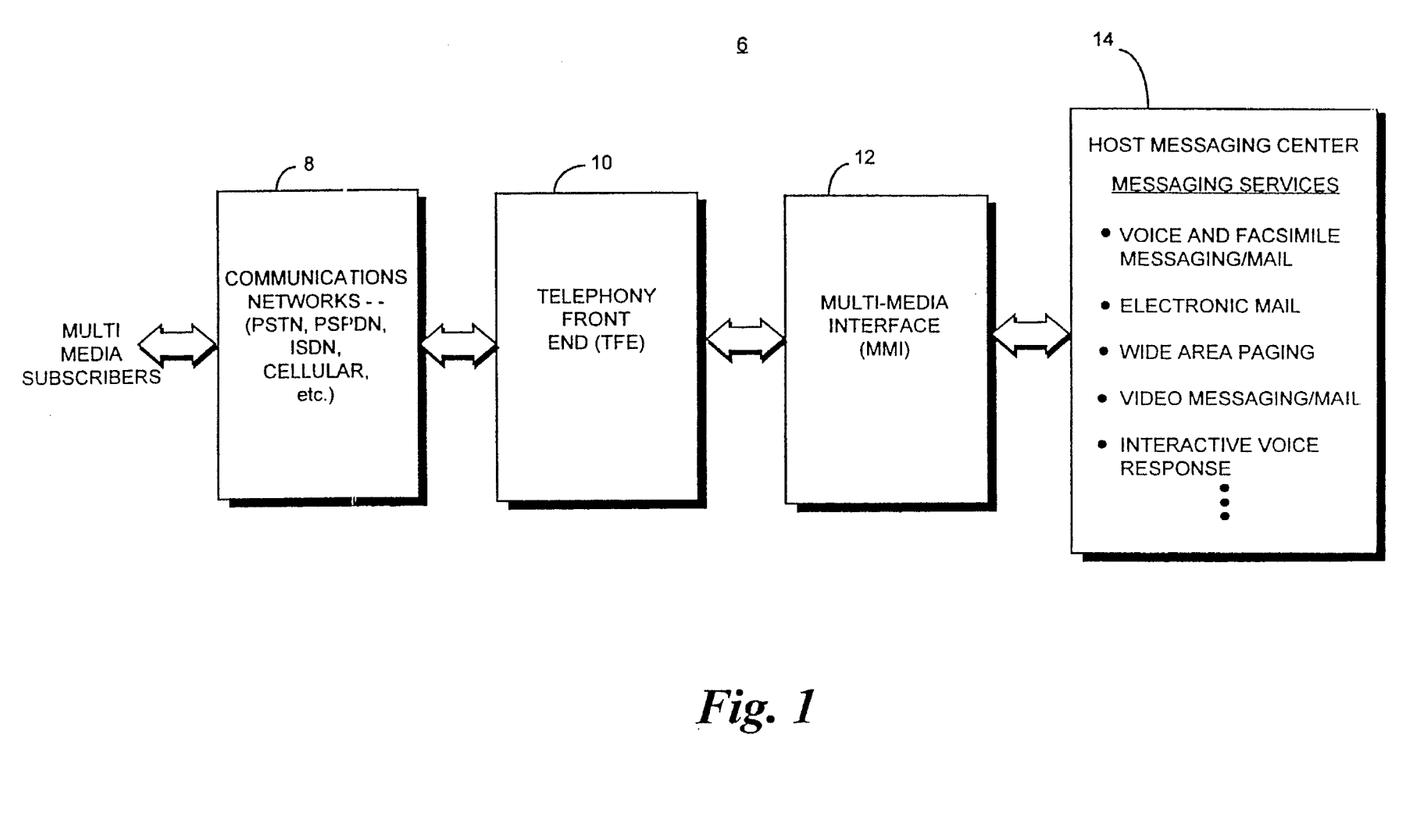
FIG. 1 illustrates a function block diagram overviewing a multi-media messaging system.

FIG. 1 shows an general overview of a messaging system 6 for providing various messaging applications/services for virtually any type of telecommunications medium. A telephony front end 10 interfaces to various public and private communications networks 8 including for example the public switch telephone network (PSTN), the public cellular or mobile telephone network (PLMN), and the packet switched public data network (PSPDN) and provides the necessary interface between a subscriber's voice or data channel from the communications network 8 and the messaging system 6.

The multi-media interface (MMI) 12 performs the necessary protocol conversions of the information received in various telecommunications formats depending on among other things the subscriber's telecommunications equipment so that the host messaging center 14 can process and/or store that information in the host's data processing and storage format which preferably is in a compressed data format. Once converted, the relevant messaging information extracted from the communications channel is processed by the host 14 to deliver the particular messaging/telephony service requested by the subscriber. Information from the host 14 responding to the customer's service request is then converted back by the MMI 12 into the communications protocol format used by the subscriber and transmitted via the telephony front end 10 and communications network 8 to the subscriber. For example, voice messaging services require the MMI 12 to convert logarithmically encoded PCM (A-law or μ-law) data into a compressed standard data format processable by the host 14, (see as one example the (ETSI) GSM 6.10 standard), and expand the compressed data into log-PCM form for transmission back to the subscriber over the telephony network.

Figure 2:
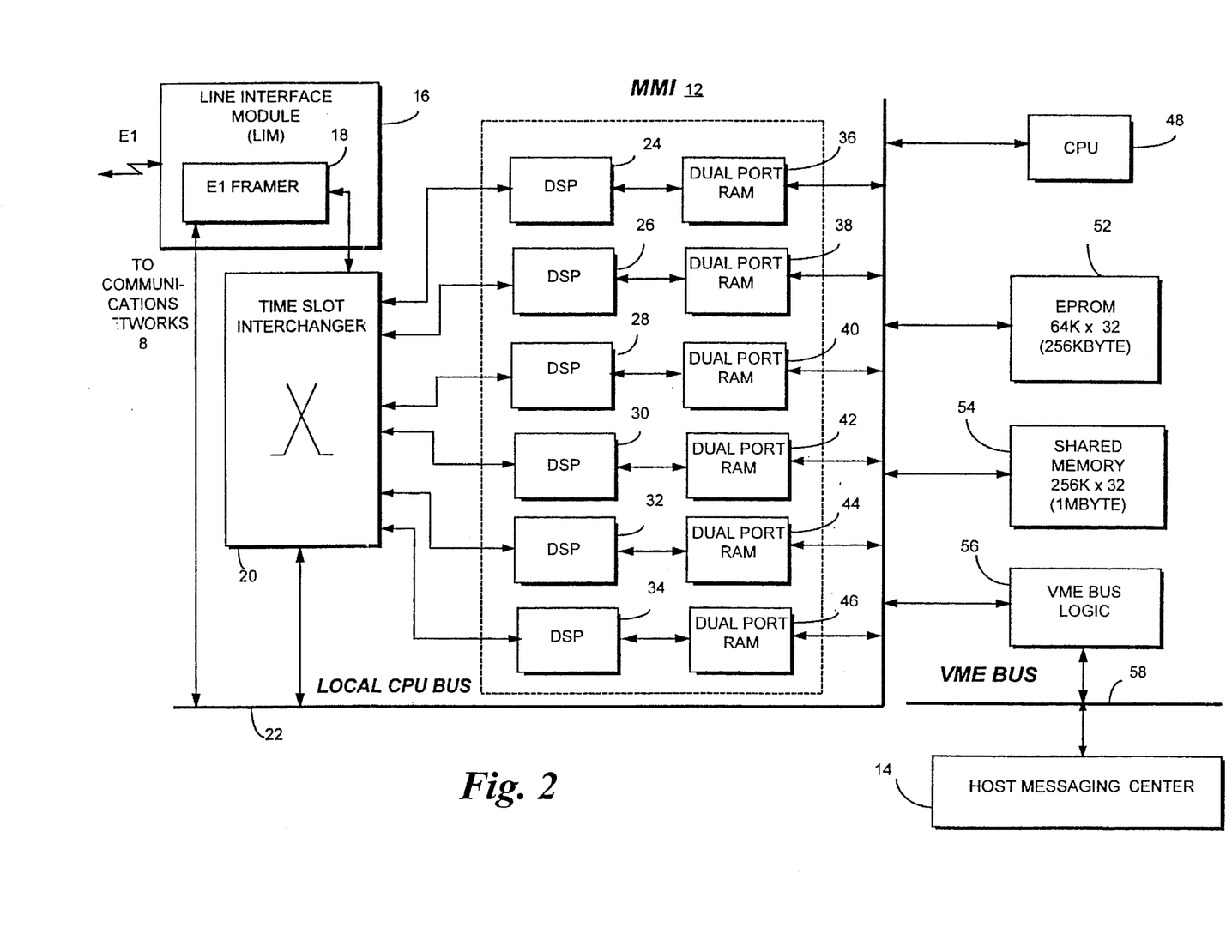
FIG. 2 is a function block diagram of the multi-media interface according to the present invention.

FIG. 2 is a more detailed function block diagram of the multi-media interface 12. MMI 12 may be a 6-U or a 9-U VME board that occupies one VME slot of a SUN work station operating platform upon which the entire messaging system shown in FIG. 1 is built. The MMI 12 includes a line interface module (LIM) 16 connected to one or more communications networks 8, a time slot interchanger 20, and six parallel digital signal processors (DSPs) 24–34 each having their own dedicated, dual port RAM 36–46. A central processing unit (CPU) 48 connects to each of the dual port RAMs 36–46, the time slot interchanger 20, and the line interface module 16 over a local CPU bus 22. An EPROM memory 52, shared memory 54, a VME bus interface 56, and VME bus 58 are used in communications with host 14. Interface 56 is a conventional VME revision C interface whose specification is available from the VMEbus International Trade Association, and has an address A24/data D32 and A32 bus master interface and an A24/D32, A32/D32, and A16/D16 slave interface to the VME bus 58. The host messaging system 14 includes one or more industrial computers, such as the SUN/6XXMp, SUN-SpARC 2, SUN-SpARC 10 and HP-7xx available from SUN Microsystems and Hewlett-Packard, respectively. The host messaging center includes the necessary data processing hardware, software, and mass storage for providing various multi-media communications services. However, since the host messaging center 14 is not the focus of the present invention, its internal architecture and operation are not described in further detail.

The line interface module (LIM) 16 interfaces the MMI 12 to the communication networks 8 via time slot interchanger 20. Line interface module 16 may be configured to handle for example North American T-1 digital carrier systems (24 TDM channels) or European digital carrier system E-1 (32 TDM channels) in accordance with their respective standards. For purposes of this exemplary, nonlimiting description only, the MMI 12 is configured to run at an E-1 rate and therefore includes an E-1 framer 18 which may be for example the Bt8510 available from Brooktree. The E-1 framer 18 identifies and discriminates individual time slots and associated channel signalling information (e.g., on-hook, off-hook, etc.) from individual subscribers over a communication network like the PSTN. It then divides the time slot and signalling information into frames and superframes of information. Each time slot or channel includes eight bits of information and each frame includes thirty-two time slot channels (i.e. for the E-1 frame format). Framer 18 also provides conventional frame synchronization (FS) and error checking signals for each frame. While only one LIM is shown, the present invention also envisions the use of two or more LIMs to further increase the MMI capacity.

The time slot interchanger 20 (TSI) receives the framed, thirty-two channels (full duplex) of TDM bit streams from the E-1 framer 18. The time slot interchanger 20 is a two hundred fifty six port, time-space-time (TST) switch dedicated to the MMI 12 which routes any external time slot of the thirty-two channels from the line interface module 16 to any of the six digital signal processors 24–34. Although six DSPs are described, any number of parallel DSPs could be used. Other suitable data processing hardware such as microcontrollers, application specific integrated circuitry (ASIC) or even more powerful DSPs may also be used. Since the time slots are separated/framed and formatted by the E-1 framer 18 and selectively routed to appropriate DSPs by the TSI 20, the DSPs are relieved of these considerable overhead processing chores. One beneficial consequence of this is that each DSP may simultaneously process multiple channels with increased processing speed. The time slot interchanger 20 also routes any information back from the six DSPs 24–34 to any time slot or channel on the line interface module 16. The time slot interchanger 20 may be, for example, a PEB2046 available from Siemens.

Time slot interchanger 20 allows a specific external time slot (external in the sense of external to the MMI) from the communications network to be selectively (i.e. based on programmable configuration of the MMI) routed to one or multiple DSPs. To illustrate the latter situation, consider the situation where a subscriber talks and simultaneously presses a touch tone key on his telephone. Thus, one external TDM time slot from a caller requesting a voice-related service, e.g. voice mail storage or retrieval, would have both voice and DTMF tone information mixed on the external time slot allocated to that caller. Hence, to accommodate this caller's service request, one or more DSPs would perform speech protocol conversion functions for any voice which is present during the time slot while another DSP would convert any DTMF tones detected during that same time slot.

The routing of an internal time slots over a desired path is established by the host messaging center based on an initial call service request analyzed by the host's call processing system. In fact, the entire call service set up/configuration for the MMI is established in advance by the call processing system. For details regarding one suitable call processor which is preferably used in conjunction with the present invention, see U.S. patent application Ser. No. 08/216,105, filed on Mar. 22, 1994 assigned to the present assignee and entitled "A Call Processing System", the disclosure of which is incorporated herein by reference. Based on information received from the host's call processor, the MMI CPU 48 configures the time slot interchanger 20 over the local CPU bus 22 to route each external time slot to one or more DSPs which have the necessary protocol conversion software for converting the protocol(s) employed in a particular call. The LIM 16 and framer 18 are typically (although not necessarily) configured once by the MMI CPU 48 via commands on CPU bus 22, and thereafter, are used to insert appropriate line signalling bits in accordance with appropriate TDM line signalling protocols.

The TSI 20 is connected to multiple digital time division multiplex (TDM) lines from a telephone network and multiple "internal" TDM lines dedicated to each of the paralleled DSPs. Each TDM line includes of course multiple external time slots, e.g. 32, per single frame, with each time slot representing a caller's channel. Under the control of the CPU 48, the TSI 20 routes time slots between the external and internal lines using a programmable connection memory programmed in accordance with a service table that summarizes the channel, service, time slot and DSP for each call in order to implement the signalling and data routing information required to provide the call service requirements as will be described in more detail below.

Figure 3A:
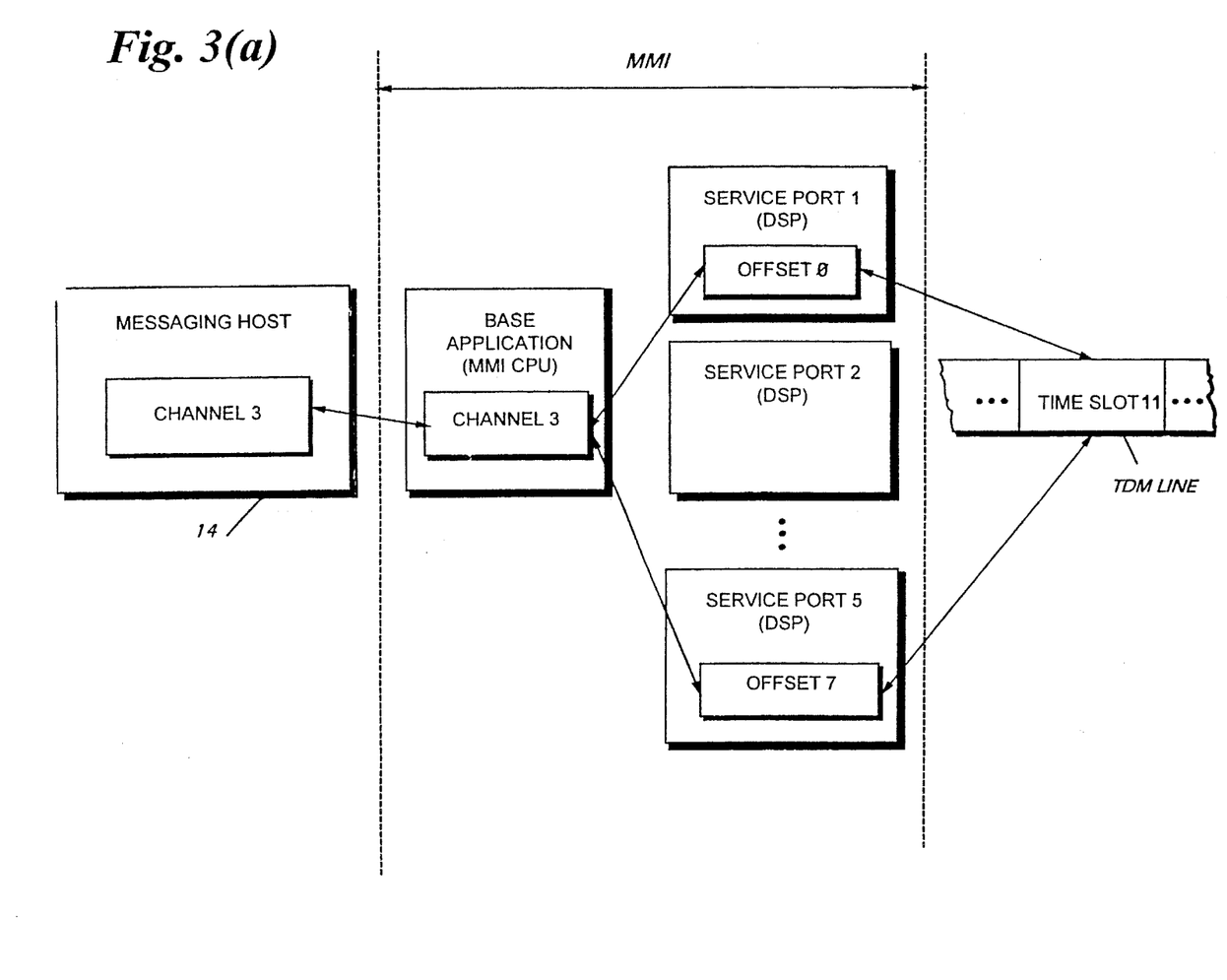
FIG. 3(a) is a schematic drawing illustrating the manner in which time slot information from a TDM line is handled by the MMI for purposes of providing channel information to the messaging host.

Referring to FIG. 3(a), a TDM line from the time slot interchanger 20 includes a time slot 11 associated with a call/caller that may include both voice information and DTMF tones. To configure the MMI 12 to process time slot 11 (and many other time slots on multiple TDM lines), the host messaging center 14 downloads a service map containing all of the signalling and data routing information required to provide necessary call processing services for time slot 11 into shared memory 54. The MMI CPU 48 converts that service map into a corresponding service table shown in FIG. 3(b) which is used by the CPU 48 to configure the various hardware in the MMI 12 to handle this caller's time slot. "Time slot" describes the bidirectional minimum unit of data on a TDM telephony line, and "channel" describes the minimum unit of a call service request recognized by the MMI 12 and the messaging host center 14. Although the channel corresponds to the time slot, it is helpful from a software configuration perspective to use the two distinct terms.

Figure 3B:
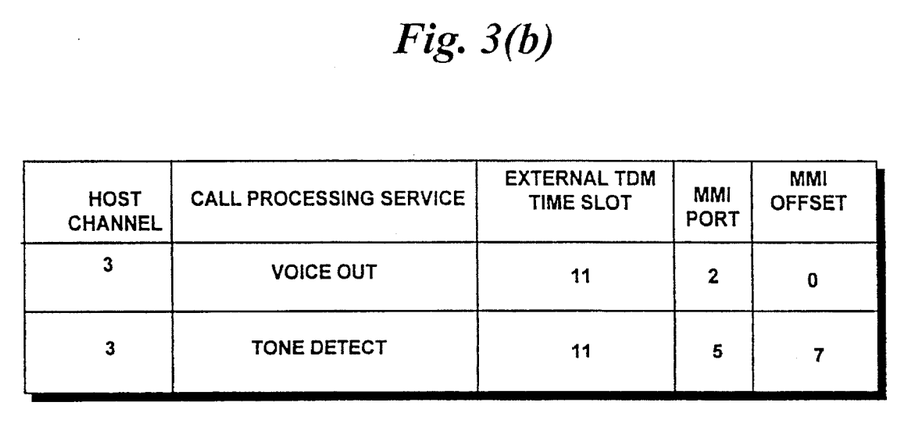

Channels are associated with call processing services performed on the channel by the host, e.g. voice out and tone detect in FIG. 3(b), and external TDM time slots are associated with subscriber information paths in and out of MMI service ports, offsets. A "service port" is an abstract software object assigned to each individual DSP, and therefore, each service port is associated with a specific protocol conversion function. A service port is partitioned into one or more "offsets" with each offset being associated with a current time slot. Accordingly, an offset is an MMI label applied to each time slot. In the example in FIG. 3(a), since time slot 11 may include both DTMF tones and voice and host channel 3 has been configured to provide "tone detect" and "voice out" messaging services, the same time slot 11 is routed to both service port 1, offset 0 which is currently configured to perform the DTMF tone protocol conversion and service port 5, offset 7 which is currently configured to perform the voice protocol conversion.

Using the [port, offset] pair mechanism, the same time slot is routed to and processed by one or more DSPs. The base application, which corresponds in hardware to the MMI CPU 48 and shared memory 54, provides the necessary interface between the host messaging center 14 and the MMI DSPs. In FIG. 3(a), it is the base application which integrates and formats offset information into the appropriate channel recognized by the messaging host. In the example, the base application integrates the protocol converted DTMF tone data (if any) from service port 1, offset 0 with converted voice data (if any) from service port 5, offset 7 into single channel 3. The base application provides similar formatting for information from a channel in the messaging host to the DSPs in the reverse direction.

Figure 4A:
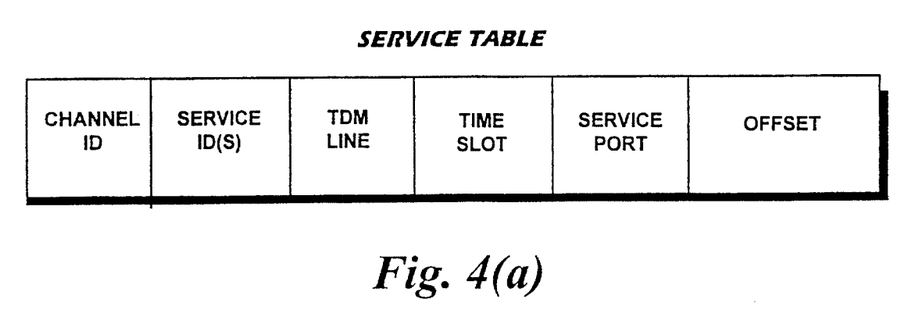
FIG. 4(a) is an exemplary service table that may be used in conjunction with the present invention.

FIG. 4(a) illustrates an exemplary format of an entry in the service table referenced in the example shown in FIG. 3(b). Each entry in the call service table includes a host channel ID, one or more a call processing service IDs, a TDM line (referring to the line from the time slot interchanger to the MMI), a time slot, a service port (corresponding to an appropriately configured DSP), and an offset (identifying the time slot at the particular service port). The MMI CPU 48 uses the unique service ID, which indicates one or more service protocols selected for this particular channel ID, in conjunction with other service table entries to allocate and configure the software service port (DSP) to perform the appropriate protocol conversion processing. The MMI CPU 48 also uses the service table to obtain all of the information necessary for routing signals among the line interface module 16, the DSP, and the CPU 48 by way of dedicated dual port RAM.

Figure 4B:
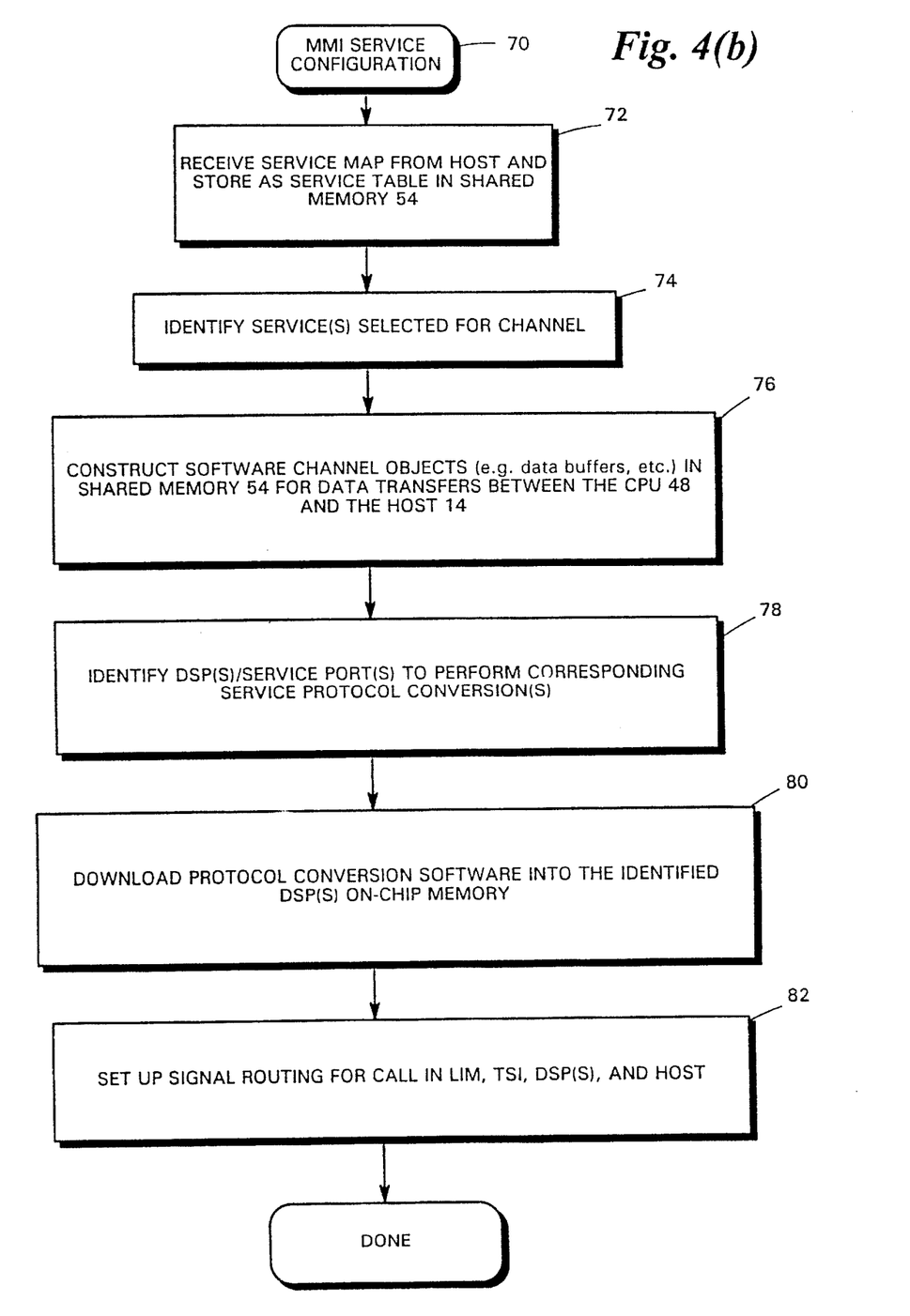
FIG. 4(b) is a flow chart diagram illustrating exemplary MMI service configuration procedures.

The MMI service configuration is now described in conjunction with the flow chart in FIG. 4(b) beginning at 70. The MMI CPU 48 orchestrates the configuration of the MMI, both at initialization and in real time. MMI CPU 48 shares its local memory 54 with the host messaging center 14. However, the host messaging center 14 does not share memory or any other control/data paths with other hardware resources in the MMI 12. The CPU 48 accesses EPROM 52 which contains default initialization tasks and limited information for all of the hardware elements in the MMI 12. At power on, CPU 48 reads from EPROM 52 to configure these hardware elements to a known state and then waits for a download from the host messaging center 14. To provide the various protocol conversion services, a service map from the host messaging center 14 is downloaded into shared memory 54 and stored as a corresponding entry in a service table as indicated in step 72 of the flow chart illustrated in FIG. 4(b). The CPU 48 uses the service table to generate the configuration of the line interface module 16, the time slot interchanger 20, the DSPs 24–34, and various software objects in the dual port RAMs 36–46. Since the service map contains all the necessary configuration for various protocol applications, dynamic reconfiguration of the MMI 12 to perform different types or amounts of protocol conversion processing is readily accomplished by changing entries in the service table. In step 74, the CPU 48 identifies the services selected for a particular host channel, e.g. channel 3 in FIG. 3(a). The CPU 48 then constructs software channel objects, e.g. data buffers, etc., in shared memory 54 which are used to implement data transfers between the CPU 48 and the host messaging center 14 (step 76). The CPU 48 identifies the appropriate DSPs/service ports to perform one or more corresponding service protocol conversions in accordance with that channel's service table (step 78). The appropriate protocol conversion software is then downloaded from shared memory 54 into the identified DSP's on-chip memory (step 80). The CPU then sets up the signal routing paths/procedures in the LIM 16, the TSI 20, DSPs 24–34, and host messaging center 14 (step 82).

Figure 5:
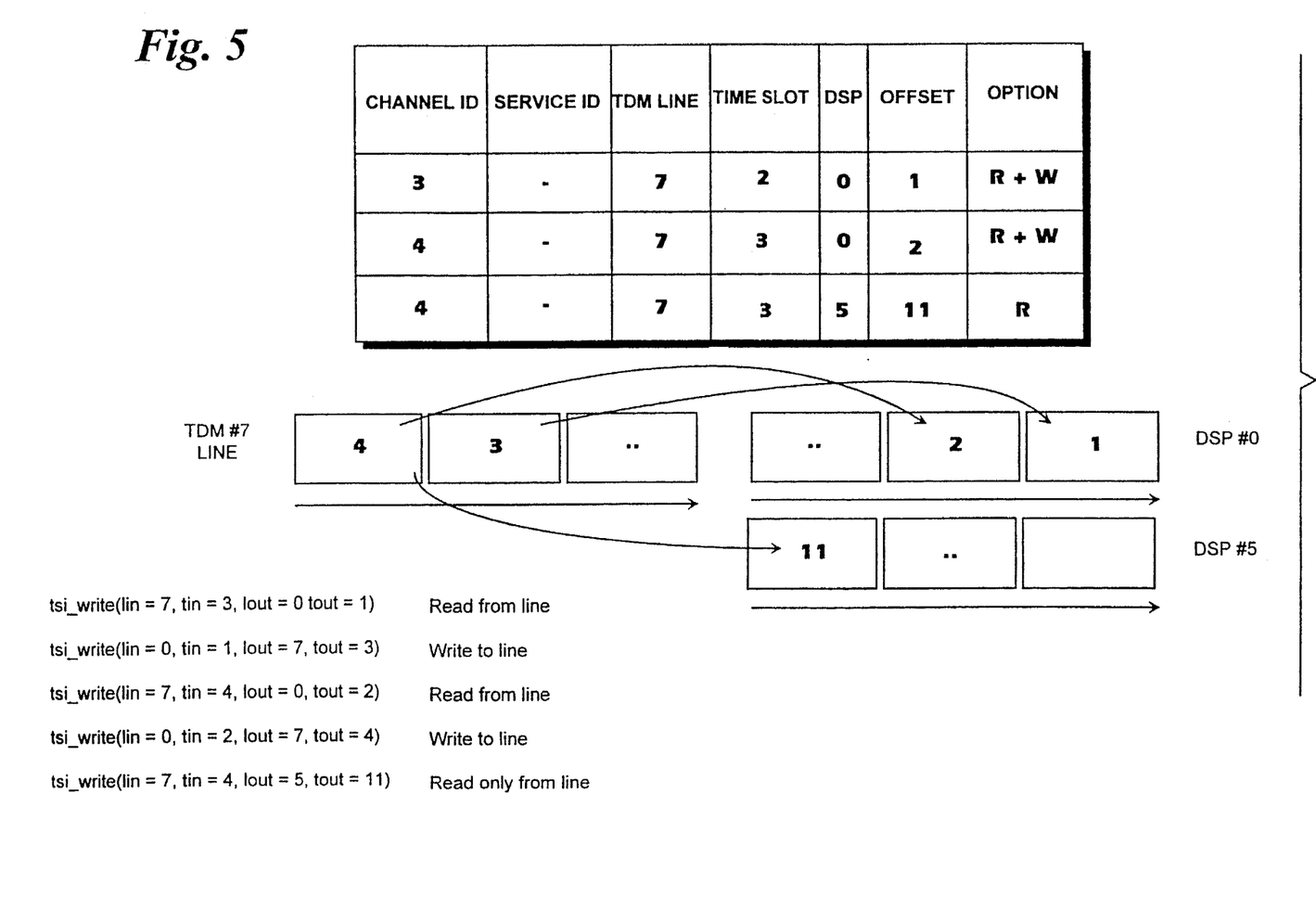
FIG. 5 shows how a service table maybe used to configure the time slot interchanger.

Thus, in the present invention, a single time slot of information can be processed by multiple parallel DSPs at the same time in order to provide a variety of sophisticated messaging services allocated to a single channel. The specific manner in which the time slot interchanger 20 routes time slots, based on the channel's service table, to the appropriate DSP or DSPs (as opposed to all DSPs) is now described in conjunction with the example shown in FIG. 5. The exemplary service table in FIG. 5 shows how the time slot interchanger 20 routes two external time slots 3 and 4 on TDM line number 7 for processing by DSP 0 as offsets 1 and 2 respectively, while only routing time slot 4 to DSP 5 at offset 11. The channel service table permits the time slot interchanger 20 to minimize the amount of data which must be processed by individual DSPs so that only those DSPs that need to read and write from a time slot on a TDM line do so. This frees the DSPs to perform their dedicated protocol conversion tasks at high speed without having to perform unnecessary overhead functions. In another example shown in FIG. 6, time slots 1 through 4 are received by time slot interchanger 20. Time slot interchanger 20 routes only time slots 1 and 4 to DSP 1 and time slots 3, 4, and 1 to DSP 6.

Specific protocol conversion algorithms are executed at very high speed by each DSP. The six digital signal processors 24–36, e.g., TMS320C50 DSPs running at 20.48 MHz and available from Texas Instruments, are connected in parallel and operate independently of each other. The DSPs preferably employ a pipelined architecture so that when the pipeline is full, the DSP is executing one instruction per clock cycle. The DSP architecture is further optimized to quickly process numeric intensive protocol conversion algorithms. For example, each DSP preferably includes on-chip program memory (both RAM and ROM) of sufficient capacity to store protocol conversion algorithm instructions for all of the messaging services supported, e.g. from relatively simple DTMF tone detection to more complicated speech recognition algorithms. The DSP also preferably includes on-chip data memory (e.g. RAM), various registers and register stacks, multiplexers, and logic/processing units such as accumulators, ALUs, multipliers, etc. Preferably (although not necessarily), each DSP also includes separate instruction and data buses so that the instruction and data fetches occur in parallel. The program bus carries instruction code and immediate operands from program memory. A data bus connects various processing and register elements to the data memory. Together, the program and data buses can carry data from on-chip memory and internal or external program memory to the various processing units in a single machine cycle.

Each DSP operates with a high degree of parallelism, i.e. while data is being operated upon by the central arithmetic logic unit, arithmetic operations may also be executed in auxiliary register arithmetic unit. Such parallelism results in high capacity arithmetic, logic, and bit manipulation operations all performed in a single machine cycle. Using such a pipelined architecture, for example, a DSP can multiply two numbers and add the result to an accumulator in a single clock cycle. For further discussion of the architecture and operation of the DSPs, reference should be made to the TMS 320C50 Users Manual. The significance of this high processing speed is that a single DSP can perform the same protocol conversion on multiple different time slots at the same time. Using the TMS320C50 DSP, for example, 5 or 6 different time slots can be processed together in real time.

Each DSP is connected to its own off-chip dual port RAM 36–46 which is a high speed, static RAM (SRAM) having for example 8K-by-16-bit storage capacity. Such an SRAM is available from Integrated Device Technologies as Model No. IDT7025. The dual port RAM is block mapped as an external data RAM shared with CPU 48. Typically, the dual port RAM is of sufficient capacity to accommodate algorithms for various protocol conversion algorithms. The program and data for performing a specific protocol conversion is downloaded from the host messaging center 14 and is transferred into the internal, on-chip memory of the DSP via its dedicated dual port RAM. The host messaging center 14 runs on a conventional operating system. For example, if the host messaging center 14 is a SUN workstation as described above, a UNIX operating system is preferably used. In contrast to traditional operating systems, the MMI 12 requires a real time operating system in order to achieve real time processing of subscriber requests from a communications network. As a result, the CPU 48 uses a real time operating system such as pSOS available from Integrated Systems Inc. Software controlling the MMI 12, which includes shared memory protocols and data structures, is written on the real time operating system.

The MMI CPU 48, which may be for example a 32-bit Motorola MC68020 running at twenty-five MHz, accesses the parallel DSPs via their dedicated corresponding 8K by 16 bit dual port SRAMs 36–46. Each DSP has an individual mailbox interrupt, reset line, software readable input pin, and a software programmable flag. At initialization of the MMI 12, each DSP is held in a reset state by the CPU 48 while a specified protocol conversion algorithm is downloaded from the host 14 into its corresponding SRAM. When a DSP is released from reset, a boot loading program stored in the DSP internal ROM moves the protocol conversion algorithm code into internal DSP RAM and commences execution of the algorithm on incoming time slot data.

Figure 6:
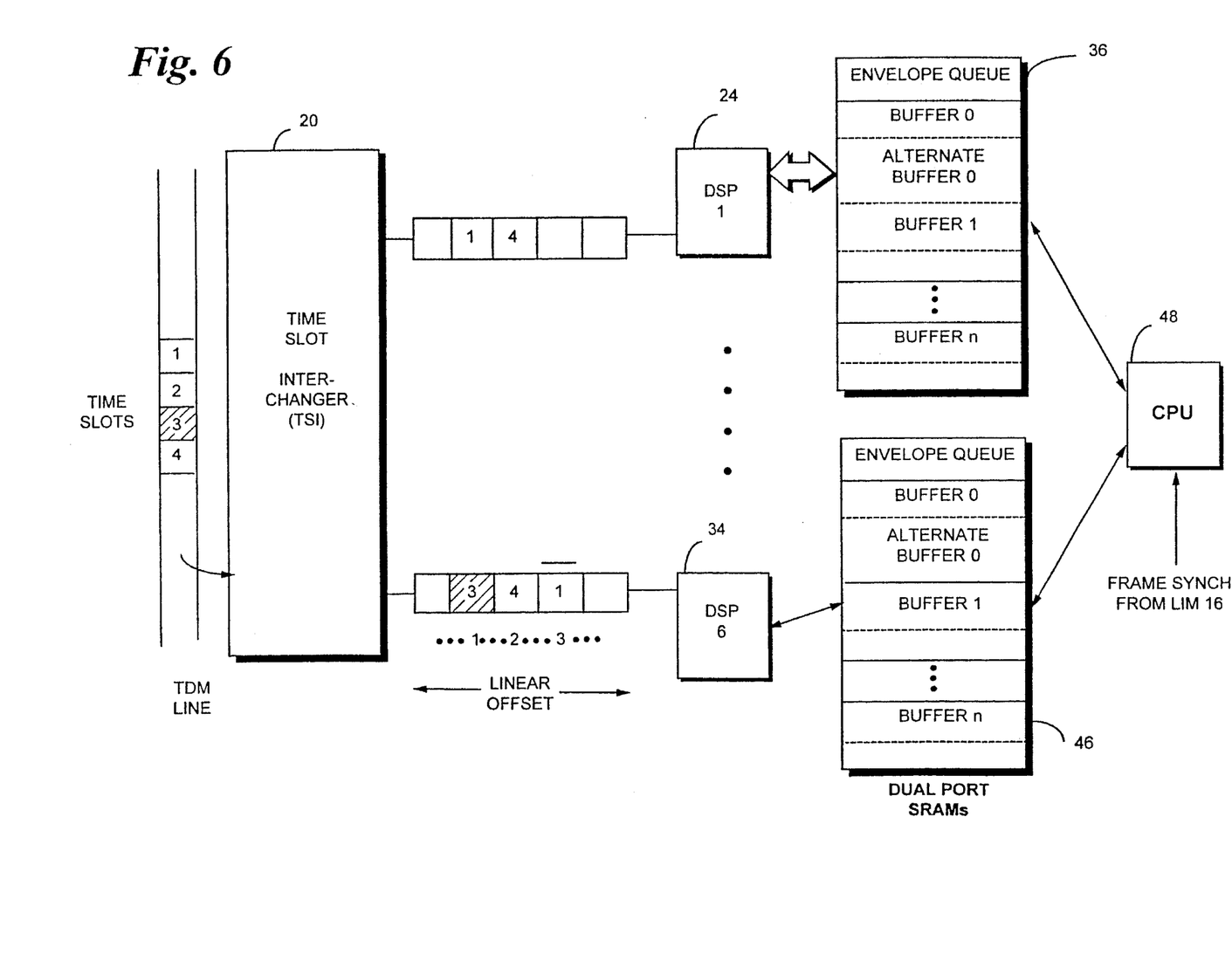
FIG. 6 is a diagram showing the time-slot/offset routing between the time slot interchanger, the DSPs, and the MMI CPU using the dual port memories.
Figure 7:
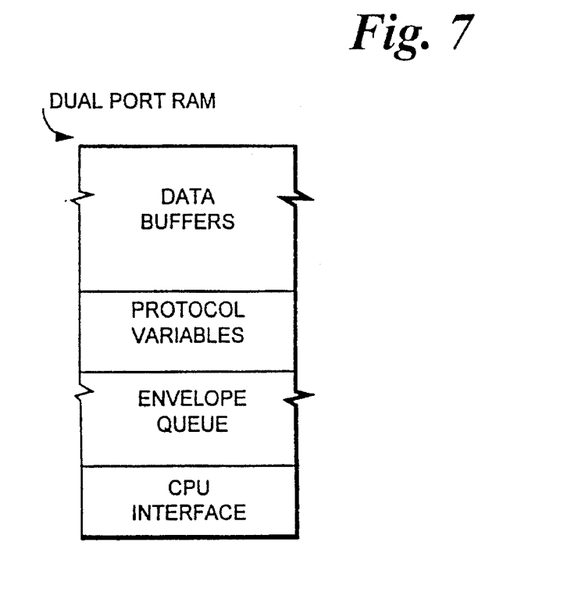
FIGS. 7 and 8 illustrate the configuration of the dual port shared memories and the use of envelope queues to access data buffer areas in the shared memory.
Figure 8:
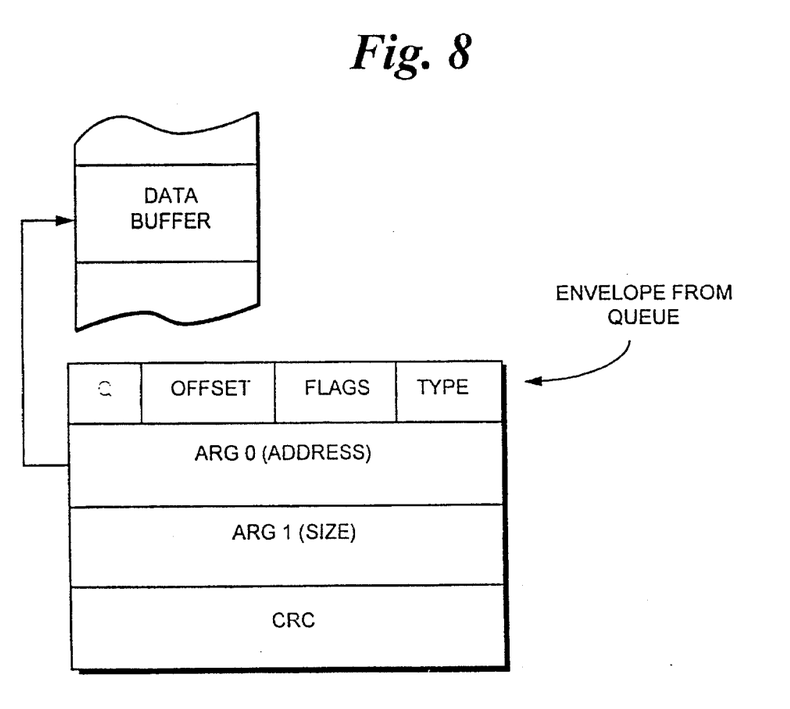

The DSPs 24–34 interface to the MMI CPU 48 using shared data/command structures and protocols by way of a queue-in and queue-out memory access technique established using their dedicated dual port RAMs 36–46. This shared memory access technique is illustrated in FIGS. 6–8. As shown in FIGS. 6 and 7, each dual-port RAM stores an envelope queue, multiple buffer/alternate buffer pairs for passing data and control between its DSP and the CPU 48, protocol variables, and a CPU interface. Each envelope in the envelope queue "points" to a corresponding block of data called a data buffer or carries other control information.

Data transfers into and out from the DSPs is by way of the data buffers in the dual port RAMs using the envelopes as the mechanism to control the transfer. Buffer size depends on the particular protocol conversion being implemented by a particular DSP. Each buffer can be thought of as a logical/operational block of data having a variable size, e.g., from 3 to 511 bytes long. Typically, the DSPs are faster than the MMI CPU 48. Accordingly, the envelopes are used to coordinate the rate of data transfer between the faster DSP and the slower MMI CPU.

The DSP transmits and retrieves buffers in for example twenty millisecond intervals, and therefore, the MMI CPU 48 must offload or load new data buffers in this same time interval. Each such data buffer is managed by an envelope that the DSP writes into its envelope queue when it has a data buffer ready for the MMI CPU. The MMI CPU then uses that envelope to retrieve at a later time (because of its slower speed) that data buffer from the dual port RAM.

As shown in FIG. 8, the MMI CPU 48 finds within the envelope all of the information necessary for accessing a particular data buffer. Each envelope includes a header with offset, flag, and type information. The offset indicates which DSP (or service port) offset data is stored in a particular data buffer. The flag indicates whether the data buffer is a read data buffer or a write data buffer as well as limited information about the contents of the data buffer attached to the envelope. The type indicates the particular protocol conversion algorithm being used by this DSP. As an example of a data envelope, argument ARG0 in the envelope stores the address in the dual port RAM of the envelope's data buffer. The size of the buffer is specified at ARG1. By specifying address and size of the data buffer in the envelope, buffers of variable size and location can be used. The CRC field ensures correct retrieval of an envelope from the envelope queue to avoid hardware errors and/or erroneous overriding of data buffers.

Figure 9:
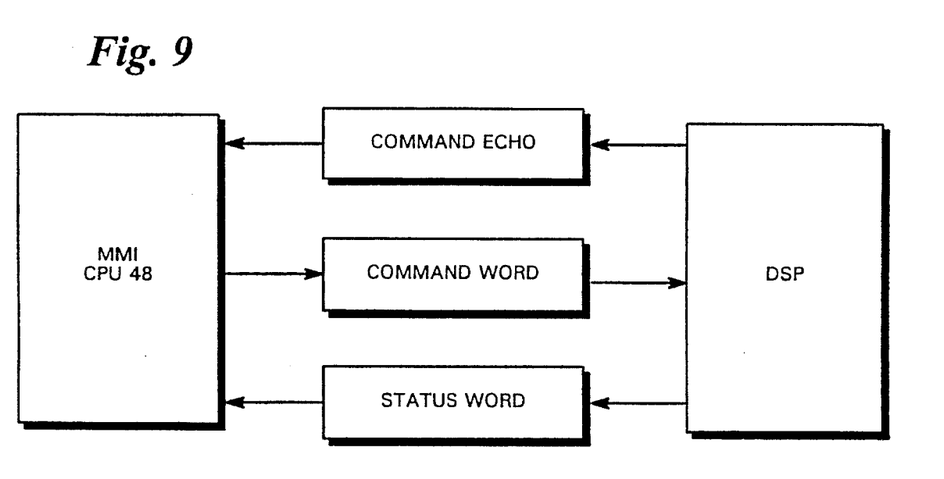
FIG. 9 illustrates the command protocol between each DSP and the MMI CPU.

The dual port RAMs also enable efficient command protocols between each DSP and the MMI CPU 48. The command protocols are carried out in the CPU interface portion of dual port RAM shown in FIG. 7. Referring to FIG. 9, as the MMI writes a channel command word into the dual port RAM, it interrupts the DSP. The DSP then reads the command and echoes it back using a command echo message to signal to the MMI CPU readiness for the next command word. Each command word to the DSP is tagged with an offset so that command is directed to a [specific DSP, offset pair]. For example, "Play GSM(3)" includes the command "Play GSM" and the offset "3". The DSP writes a status word to the MMI CPU to interrupt the MMI CPU indicating either normal or abnormal operation.

The envelope queue access protocol ensures that only one entity (either the MMI CPU 48 or a DSP) writes to the queue at one time. Envelopes are read or removed from the queue one at a time in a fixed order ensuring reliable information exchange. An example of how offset data (corresponding to a particular time slot) is transferred from a DSP to the MMI CPU is shown in the flow chart illustrated in FIG. 10 beginning at 90. Reference is also made to FIG. 6 which shows graphically the envelope queue and multiple data buffer and alternate data buffer structures stored in the dual port RAM of each DSP.

Figure 10:
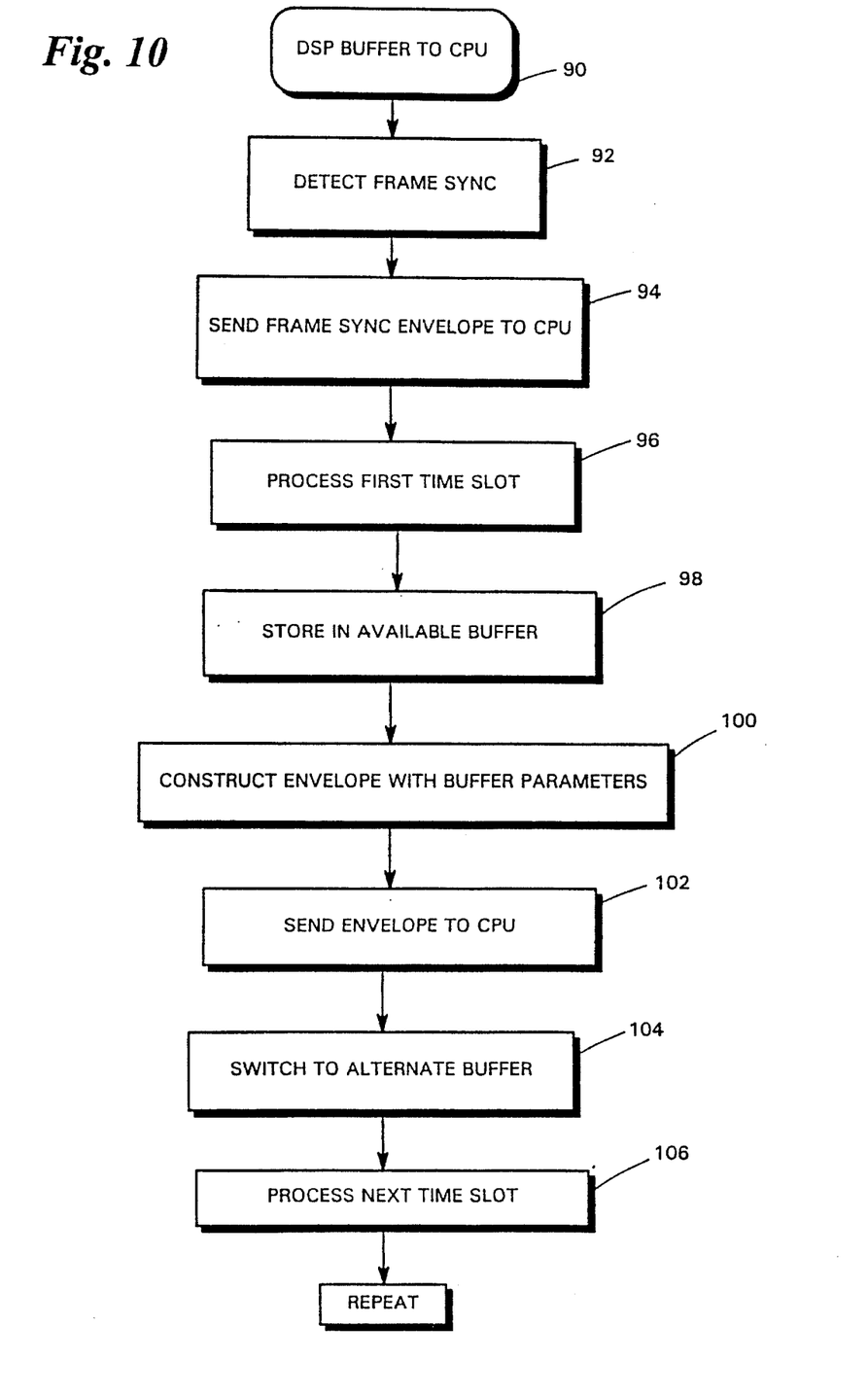
FIG. 10 is a flow chart diagram illustrating an alternate buffering procedure for transferring data buffers from a DSP to the CPU.

In order to synchronize the protocol conversion and data transfer operation with the actual time slot information coming down and going to the TDM line, the data transfer operation is synchronized with the frame sync from the TDM line. (Each frame of 32 time slots for example has one or more frame sync bits). After detecting frame sync in step 92, the DSP sends a frame sync envelope to the MMI CPU in step 94 to indicate that it is ready to transfer time slot data. In step 96, the first time slot/offset is processed in accordance with the protocol conversion algorithm being executed by that DSP. The processed data is then stored in the available buffer (step 98). An envelope with the particular buffer parameters is constructed in step 100. The buffered envelope is then sent to the MMI CPU in step 102. While the CPU 48 is reading the corresponding buffer of information, the DSP switches to the alternate buffer in step 104 and puts the contents of the next processed time slot received by the DSP in the alternate buffer. In step 106, the DSP then processes the next time slot using the other available buffer. As will be appreciated by those skilled in the art, a similar procedure using envelopes and alternate buffer pairs is employed to transfer time slot information from the MMI CPU to the DSPs through its dedicated dual port RAM.

It will be apparent to those skilled in the art to which the specification is addressed that the embodiments heretofore described may be varied to meet particular specialized requirements without departing from the true spirit and scope of the invention disclosed. The foregoing embodiment is therefore not limited but rather exemplary of the structures and manner in which the present invention may be implemented. Instead, the scope of the invention is defined by the spirit and language of the appended claims.

What is claimed is:

1. A universal multi-media system interface for interfacing various communication networks with a multi-media messaging system that provides communications services to subscribers, comprising:

parallel signal processors, each processor selectively processing in parallel messages in a particular communication format in accordance with a reconfigurable protocol conversion algorithm;

a line interface module connecting the multi-media interface to the various communications networks for dividing messages received over multiple communications links in the communications networks into frames, each frame including a plurality of time slots;

a time slot interchanger for receiving framed messages from the line interface module and selectively routing various time slots of information to one or more of the parallel signal processors; and a supervisory processing unit for selectively downloading protocol conversion algorithms from the multi-media messaging system in real time into one or more of the parallel processors while continuing to process messages in another of the parallel processors to reconfigure the one or more of the parallel processors in real time to selectively perform protocol conversions on the selectively routed time slots, wherein the multi-media messaging system provides call processing services to subscribers using different types of communications media.

2. The system according to claim 1, wherein the messaging services include one or more of the following: voice messaging, facsimile messaging, voice mail, facsimile mail, wide area paging, video messaging, video mail, interactive voice messaging, and short messaging services.

3. The system according to claim 1, further comprises:

a line interface module for interfacing the multi-media interface with one or more time division multiplex (TDM) lines in the communications network, each TDM line having multiple time slots, and a time slot interchanger for routing time slots between the line interface module and the parallel processors.

4. The system according to claim 3, wherein the time slot interchanger is configured to selectively route only those time slots to each parallel processor that actually requires the protocol conversion currently being performed by that parallel processor.

5. The system according to claim 3, wherein each parallel processor performs a subscriber protocol conversion on multiple time slots in parallel.

6. The system according to claim 3, wherein the time slot interchanger routes a single time slot to plural parallel processors.

7. The system according to claim 1, wherein the parallel processors are digital signal processors.

8. The system according to claim 1, wherein the plural types of communication media include one or more of the following: voice, facsimile, and video, and common channel signalling.

9. The universal multi-media system interface according to claim 1 further comprising:
a plurality of first shared memories, each first shared memory accessible by one of the signal processors and by the supervisory processing unit, and
a second shared memory accessible by the supervisory processing unit and by the multi-media messaging system, wherein the first and second shared memories are used in the real time reconfiguration of the one or more parallel signal processors.

10. The universal multi-media system interface according to claim 9, wherein the real time reconfiguration includes real time switching of protocol conversion algorithms processors and real time exchange of data to and from the parallel signal processors.

11. A messaging system responsive to different types of communications media, comprising:
a host messaging center for providing messaging services;
a plurality of messaging subscribers sending messaging information over one or more communications networks using different subscriber communication protocol formats; and
a multi-media interface connected to the host messaging center and the one or more communication networks, including:
parallel processors for converting in parallel messaging information received in the different subscriber protocol formats into a host protocol format employed by the host messaging center and for converting messaging information in the host protocol format into corresponding different subscriber protocol formats, each parallel processor performing one of a plurality of different subscriber protocol conversions on messaging information to/from plural subscribers;
a plurality of memories each memory being dedicated to one of the parallel processors; and
a central processor connected to the plurality of memories, wherein information is transferred between each parallel processor and the central processor using the parallel processor's dedicated memory.

12. The system according to claim 11, wherein the central processor configures each parallel processor to perform a particular one of the plurality of different subscriber protocol conversions by transferring program data for executing the particular subscriber protocol conversion to the parallel processor through the parallel processor's dedicated memory.

13. The system according to claim 12, wherein the central processor configures each parallel processor in real time.

14. The system according to claim 12, wherein the central processor reconfigures one or more of the parallel processors in real time to perform a different subscriber protocol conversion.

15. The system according to claim 11, wherein each memory includes plural data areas for storing messaging information in the host protocol format with each data area having a first buffer and a second buffer and wherein stored messaging information is transferred by one of the parallel processor and the central processor and is received by the other of the parallel processor and the central processor using the first and second buffers.

16. The system according to claim 15, wherein the dedicated memory includes a queue that stores for each data area corresponding identification data for identifying and accessing the data area in the dedicated memory.

17. A messaging system responsive to different types of communications media, comprising:
a host messaging center for providing messaging services;
a plurality of messaging subscribers sending messaging information over one or more communication networks using different subscriber communication protocol formats; and
a multi-media interface, connected to the host messaging center and the communication networks, including parallel processors for converting in parallel messaging information in the different subscriber protocol formats into a host protocol format and for converting in parallel messaging information in the host protocol format into corresponding different subscriber protocol formats,
wherein the host messaging center dynamically reconfigures the multimedia interface in real time, wherein the host messaging center configures the multi-media interface to perform selected protocol conversions using a software service table provided at the multi-media interface that correlates a subscriber communications channel with one or more call processing services and wherein one or more of the parallel processors performs protocol conversions in accordance with the software service table.

18. The system as in claim 17, wherein the host messaging center dynamically reconfigures the multi-media interface by changing entries in the software service table.

19. The system as in claim 17, wherein entries in the software service table selectively route messaging information corresponding to the subscriber communications channel to/from the one or more processors.

20. The system as in claim 17, wherein a single channel is correlated with plural processors.

21. The system as in claim 17, wherein a single one of the parallel processors is correlated with plural channels such that messaging information from the plural channels is converted into the host protocol format simultaneously by the single processor.

22. The system as in claim 21, wherein the single processor simultaneously converts messaging information from three or more channels into the host protocol format.

23. The system as in claim 17, the multi-media interface further comprising:
a line interface module for interfacing the multi-media interface with a time division multiplex (TDM) line in the communications network, the TDM line having multiple time slots with each time slot corresponding to a subscriber communications channel, and
a time slot interchanger for routing time slots between the line interface module and the parallel processors.

24. The system as in claim 23, wherein the time slot interchanger is configured by the software service table to route only those time slots to each parallel processor that require the protocol conversion currently being performed by that parallel processor.

25. A messaging system responsive to different types of communications media, comprising:
a plurality of messaging subscribers transmitting messaging information over one or more communications networks using different subscriber communication protocol formats;

a host messaging center for providing messaging services to the subscribers; and a multi-media interface, connected to the host messaging center and the communication networks, including:

parallel processors for converting messaging information in the different subscriber protocol formats into a host protocol format employed by the host messaging center in accordance with protocol conversion algorithms, each protocol conversion algorithm corresponding to one of the different subscriber protocol formats;

parallel memories, each of the parallel processors being associated with one of the memories; and a central processor connected to the parallel memories and the host messaging center, wherein conversion algorithms are selectively loaded into each of the parallel processors by the central processor from the host messaging center using the associated memory and a different conversion algorithm is loaded in real time into one or more of the parallel processors in response to commands from the host messaging center.

26. The system as in claim 25, wherein plural ones of the parallel processors convert pulse code modulated voice signals into a compressed format.

27. The system as in claim 25, wherein the associated memories are dual port memories shared by the associated processor and the central processing unit with data being communicated asynchronously between each of the parallel processors and the central processing unit using the associated shared memory.

28. The system as in claim 27, wherein each shared memory includes plural data transfer buffers, the associated processor storing data for the central processing unit in one of the transfer buffers and retrieving data from the central processing unit from another of the transfer buffers.

29. The system as in claim 28, wherein each data buffer is managed by a corresponding envelope that points to the location in the shared memory of the corresponding data buffer and wherein the envelopes are stacked in an envelope queue and used by the corresponding processor and the central processing unit to access information stored in the data buffer.

* * * * *